May 14, 1929.  J. KÜBLER  1,712,505
RECTIFYING SYSTEM AND FEEDING APPARATUS THEREFOR
Filed March 23, 1922   2 Sheets-Sheet 1
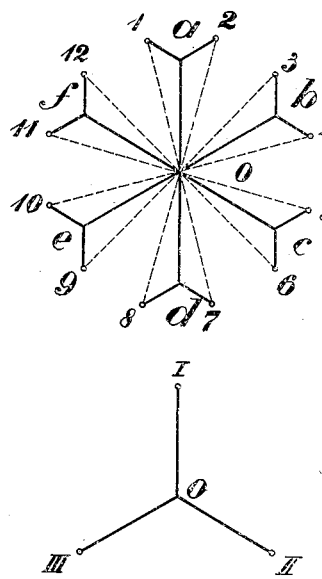
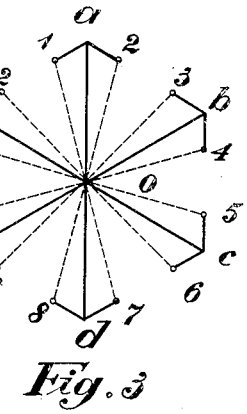
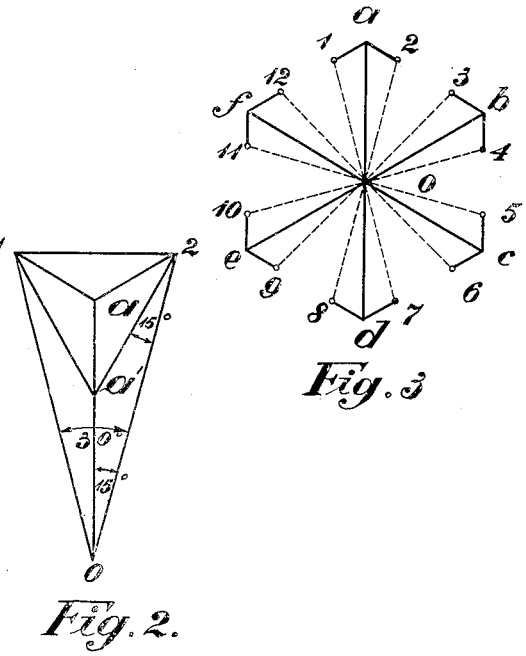
Fig. 1.  Fig. 2.  Fig. 3.
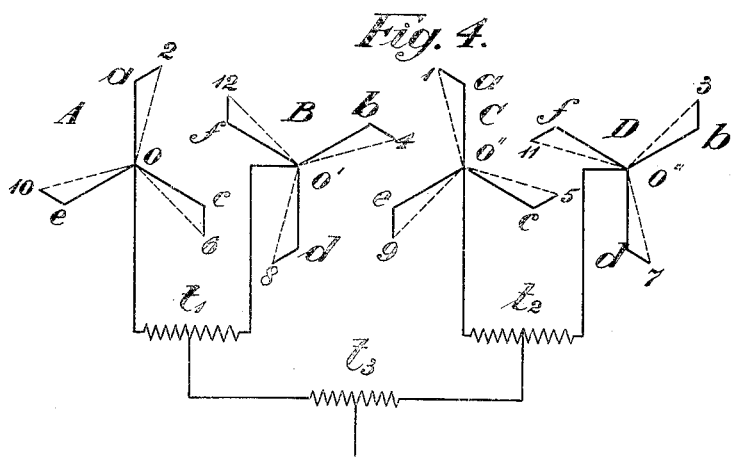
Fig. 4.
Inventor
J. Kübler,
By Marks & Clerk
Attys.

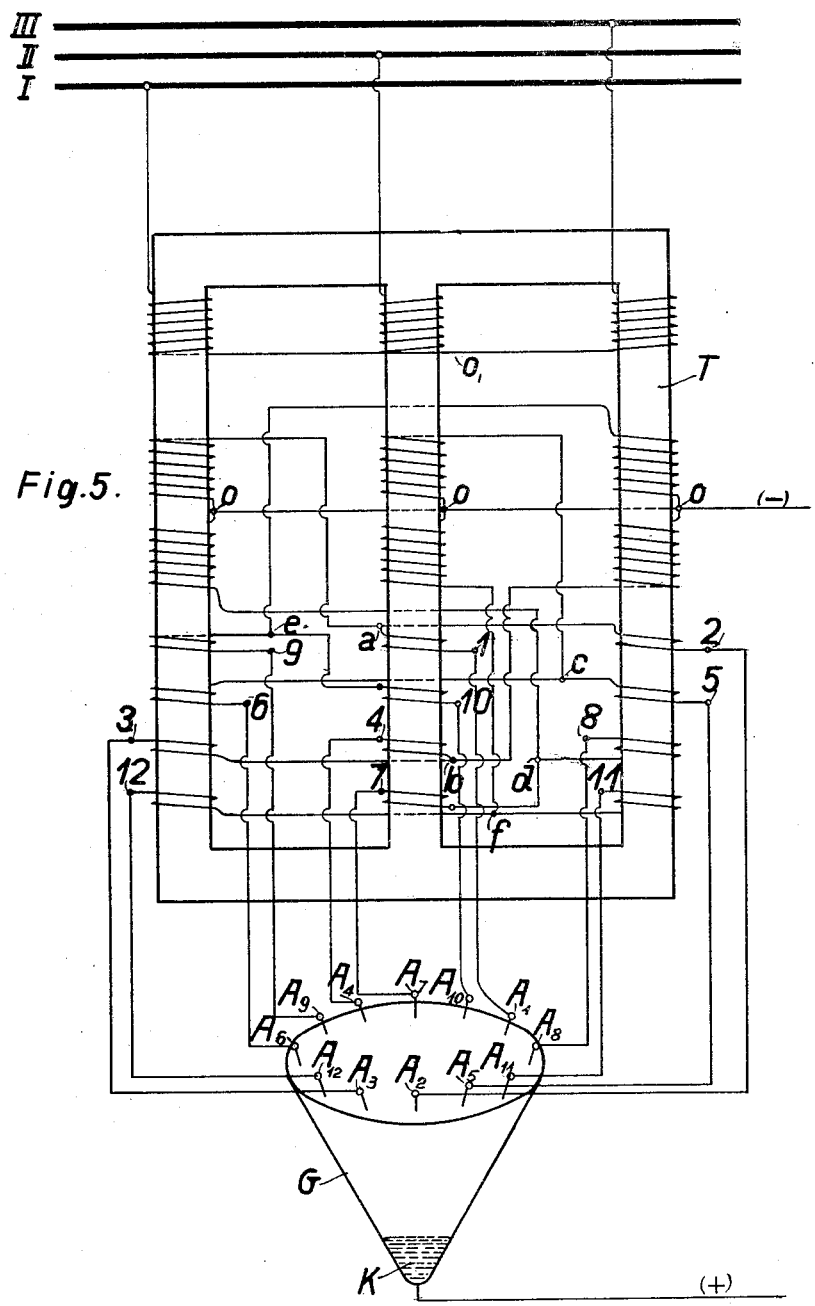

Patented May 14, 1929.

1,712,505

UNITED STATES PATENT OFFICE.

JOHANN KÜBLER, OF BADEN, SWITZERLAND, ASSIGNOR TO AKTIENGESELLSCHAFT BROWN, BOVERI & CIE., OF BADEN, SWITZERLAND.

RECTIFYING SYSTEM AND FEEDING APPARATUS THEREFOR.

Application filed March 23, 1922, Serial No. 546,304, and in Switzerland March 24, 1921.

This invention relates to improvements in rectifying systems and feeding apparatus therefor.

For the purpose of feeding polyphase mercury vapour rectifiers comprising a number of anodes that is greater than the number of the phases of the supply circuit, generally transformers are employed whose secondary winding system receives a correspondingly increased number of phases.

The manner in which the increase of the number of secondary phases is attained, is not without influence upon the working of the connected rectifier.

Of particular importance is the fact that the current-load on the several anodes shall be equal, and that those phases of the secondary winding of the transformer that constitute intermediate phases relatively to the originally given phases, which may be designated as basal phases, show the same induction conditions as these last-mentioned phases.

In the usual method of generating an increased number of secondary phases the procedure has been as follows:—

On one hand the secondary phases corresponding to the primary phases have been used for feeding one group of anodes, while on the other hand for the other anodes, intermediate phases have been generated from the phase-combination of the first-mentioned originally given phases.

In that method of producing polyphase secondary systems, however, the different phases of the secondary winding, when compared with one another, are not equivalent, because some phases consist of windings which are situated each only on one core of the transformer, whereas another phase consists of windings arranged on different cores. The first-mentioned phase has a voltage which is the arithmetical sum of all the voltages induced in its component parts, whereas the last mentioned phase has a voltage which represents the geometrical sum of the different-phased voltages induced in its separate component parts, so that the number of its winding turns, taken absolutely, is much greater than the number of the winding turns of a phase winding the component parts of which are all of the same phase.

The foregoing differences in the structure of the different phase windings have a decided effect on the operation of the anodes of the rectifier. The difference in the numbers of turns of the individual phase windings and the relative location of the same on one or more cores, results in differences in the ohmic resistance and reactive impedance of the individual phases. As a consequence, the effective current in the various anodes is likewise quite different. In fact, considerable differences, up to 50%, have been observed in practice. This indicates an incomplete utilization of the rectifier as well as of the transformer, since, if one group of anodes is loaded to its maximum amount, the load on the other anodes is still short of that said amount.

The present invention avoids the foregoing difficulties by so arranging the secondary winding of the rectifier supply transformer that the differences in the windings of the individual phases are eliminated and by so connecting the various phases to the rectifier that the current flow produces substantially identical resistive and reactive drops in the various phases.

To this end each of the phases of the secondary winding of the transformer is composed of similar component winding elements belonging to different phases of the basal phase system, as determined by the supply circuit, or the core structure, of the transformer. The individual secondary phases, which are thus substantially alike in respect of resistance, as well as reactance, are suitably connected in star and the star end terminals are connected to similar electrodes of the rectifier, thus resulting in a current distribution which insures balanced current flow in the individual phases of the transformer, as well as of the rectifier. As a result, thereof the secondary winding phases are all similar as regards the voltage, the voltage-drop and the current in the same.

The apparatus may be obtained in a simple manner by combining all the secondary phases in one and the same manner from the same number of portions of windings of the basal phase system to produce similar phase shifts relatively to one another.

The invention will now be more fully described with reference to its embodiments illustrated by way of example in the accompanying diagrammatic drawings, in which Fig. 1 is a vectorial diagram of the winding connections of the improved transformer embodying my invention;

Fig. 2 is an explanatory diagram illustrating the relative proportions of the winding elements utilized in transformer connections of Fig. 1;

Fig. 3 is a diagram similar to Fig. 1, illustrating another embodiment of my invention;

Fig. 4 is a diagram similar to Fig. 1, illustrating an embodiment of my invention, having balance coils for causing an overlapping of the anode currents; and Fig. 5 is a diagrammatic view of a transformer and rectifier system arranged in accordance with the diagram in Fig. 1.

In Figure 1:—Vectors 0 1, 0 2, 0 3 ... 0 12 represent a secondary twelve-phase system which has been produced from the primary or basal phases, represented by vectors 0 I, 0 II and 0 III, by building-up each of the secondary phases in one and the same way. Each secondary phase is composed of two winding portions belonging to different phases of the basal phase system. In the particular embodiment of my invention illustrated in Fig. 1, the secondary twelve-phase winding system is obtained from the three-phase primary basal winding system by first connecting six winding portions 0 $a$, 0 $b$, ... 0 $f$ belonging to the three basal phases $0_1$I, $0_1$II, $0_1$III into a balanced star-connected six phase winding. To each of the end points $a$ $b$ ... $f$ of the six phase winding are connected pairs of winding elements $a$ 1, $a$ 2; $b$ 3, $b$ 4; ... $f$ 11, $f$ 12, belonging to the basal phases which are shifted 120° with respect to the phase to which they are connected. By properly proportioning the length of the additional winding elements connected to the end points $a$, $b$ ... $f$ of the six-phase star winding, the end point of the additional winding elements will constitute terminals 1, 2 ... 12 of an open-star-connected balanced twelve-phase winding suitable for supplying a twelve-phase rectifier in accordance with the principles outlined above.

The relative proportions of the three-phase winding elements, utilized to obtain the balanced twelve-phase winding shown in Fig. 1, may be readily determined from a consideration of the geometrical relation between the vectors representing the individual phases constituting the component parts of the resultant twelve-phase system, as shown in Fig. 2. Since the vectors 0 1, 0 2 represent a twelve-phase system, they enclose an angle of 30°, as indicated by an arrow in Fig. 2. On the other hand, the vectors $a$ 0, $a$ 1, $a$ 2 constitute phases of the basal three-phase system, and are accordingly shifted against each other by 120°. By drawing the equilateral triangle 1$a'$2, and taking the vector $$a1 = a2 = aa' = \text{unity},$$

we obtain $$a'1 = a'2 = 12 = \sqrt{3} = 1.73$$

and since $a'$ 2 = $a'$ 0, being the sides of an isosceles triangle, $$0\ a = 2.73 \text{ or } a1/0\ a = a2/0\ a = 1/2.73.$$

Accordingly the winding portions 0 $a$, 0 $b$ ... 0 $f$ have approximately 2.73 as many turns as the additional winding elements $a$ 1, $a$ 2; $b$ 3, $b$ 4; ... $f$ 11, $f$ 12.

In the twelve-phase system, which is thus obtained from the basal three-phase system, each of the phases is symmetrically displaced against the basal phases of the three-phase system, or the equivalent six phase system, the two phase systems being symmetrically shifted with respect to each other. Furthermore, each of the phases of one system is composed of exactly alike winding portions of the other system thus resulting in a multiple phase winding, each phase of which is exactly alike in respect to the number of turns, the location of the winding portions on the different phases of the transformer core, ohmic resistance and reactive impedance.

By connecting the anodes of the rectifier to the twelve terminals of the improved open-star-connected twelve phase winding, a perfectly balanced current flow through the individual anodes will be obtained, thus radically avoiding the deficiencies of prior-art winding systems which, while more complicated than the winding of the present invention, caused uneven current distribution between the anodes.

In the twelve-phase system of Figure 1, all the twelve phases are consequently entirely equivalent as regards the amount of their voltage and their voltage-drop, so that the anodes of the rectifier will carry equal currents.

The manner of phase-combination illustrated in Figure 1 is however not the only possible one that will lead to the desired result.

Thus, for instance, the secondary-winding phases may also be made in the manner illustrated in Figure 3. The reference letters and numerals have the same significance as those of Figure 1. In Figure 3, however, the ratio of the vectors $$\frac{a1}{0a} = \frac{a2}{0a} = \frac{b3}{0b} \cdots \text{ is } \frac{1}{3.73}.$$

If, for the purpose of effecting an overlapping of the anode currents, the secondary-winding system be resolved into symmetrical three-phase systems coupled together inductively by means of interlinking or balancing transformers, the several phase-systems may then be arranged, for instance, in the manner illustrated in Figure 4.

In this Figure 4, the twelve-phase system of Figure 1, is resolved into the four three-phase systems A, B, C, D, with four separate zero points O, O', O'', O'''. Of these, A and B are first coupled inductively by the the interlinking transformer $t_1$ and C and D are coupled inductively by the interlinking transformer $t_2$. But by means of the interlinking transformer $t_3$, these two groups are again in their turn brought into a mutual inductive relation of such nature that every current flowing into one group or anode, has a tendency to generate a similar current in the other group, thus effecting an overlapping of the currents and raising the effective value of the anode currents.

In this arrangement also, the windings of all the twelve phases are quite equivalent to one another as regards voltage, voltage-drop, and the current they carry, so that the working of the rectifier is rendered also in this case more economical than hitherto.

Fig. 5 illustrates the arrangement of the windings, vectorially illustrated in Fig. 1, on the cores of a three phase transformer T and the connections of the windings to a three phase supply line I, II and III and a direct-current mercury-arc rectifier G, respectively. Corresponding winding portions in the vectorial diagram Fig. 1 and in the diagram of connections Fig. 5 are similarly designated. The three phases of the primary supply winding $O_1$I, $O_1$II, $O_1$III are disposed upon the three core legs of the transformer T and are connected in star to the supply line. The coils $O$ $a$, $O$ $b$, ... $O$ $f$; $a$ 1, $a$ 2, $b$ 3, $b$ 4, ... $f$ 11, $f$ 12 are suitably distributed on the three cores of the transformer T and connected in open star according to the diagram Fig. 1. The 12 terminals 1 to 12 of the twelve phase secondary winding thus obtained are connected to twelve anodes A 1 to A 12 of the mercury-arc rectifier G, a direct-current line, designated by a minus symbol (—) and a plus symbol (+), respectively, being connected to the neutral point O of the star and to the cathode K of the rectifier.

What I claim is:—

1. A polyphase winding, comprising a plurality of winding elements belonging to, and constituting in themselves, a balanced basal polyphase system, different lengths of winding elements, belonging to different phases, being connected in series to constitute a plurality of resultant phase windings for each phase of the basal phase system and symmetrically shifted thereagainst, the resultant phase windings being connected in open star to constitute in themselves a balanced polyphase winding system having a multiple of the number of phases of the basal system and symmetrically shifted thereagainst.

2. A transformer having a balanced polyphase winding of a relatively large number of phases, said winding comprising a plurality of phase windings connected in open star, each of the phase windings comprising two serially-connected winding elements belonging to different phases of a balanced basal phase system having a relatively small number of phases, said two serially-connected winding elements being of different lengths, the relatively short and long winding elements being so distributed between the individual phases that balanced voltage and current conditions obtain in the polyphase winding as well as in the basal phase system.

3. A transformer comprising a core and primary and secondary polyphase windings on said core, one of said windings constituting a basal polyphase system having a relatively small number of phases corresponding to the core of said transformer, the other of said windings comprising a plurality of star-connected winding elements constituting a balanced polyphase system having a number of phases corresponding to said basal phase system, the open end point of each of said winding elements having serially-connected thereto an additional winding element of a different phase of said basal phase system, the serially-connected winding elements of each phase being of different length and so apportioned that the end points of said additional winding elements constitute in themselves the terminals of an open-star-connected polyphase winding having its phases symmetrically shifted with respect to the basal phase system.

4. In a transformer device, an interconnected polyphase winding comprising a star-connected polyphase winding of a basal phase system, a pair of additional winding elements symmetrically connected to the end points of each phase of said star-connected polyphase winding, said additional winding elements belonging to different phases of said basal phase system, the interconnected winding elements being so proportioned that the free terminals thereof constitute an open-star balanced polyphase system in which a balanced current flow is accompanied by balanced current and voltage conditions throughout all phases.

5. In a rectifying system, a polyphase supply line, rectifier apparatus having anodes greater in number than the number of phases of said line, and transformer means providing an operative connection between said line and said apparatus and comprising primary winding means connected to said line and providing phases of number equal to the number of phases of said line and secondary winding means having a neutral point and providing rectifier supply phases of number equal to the number of said anodes, a winding element forming part of said secondary winding means and being connected at one end to said neutral point and being common with respect to adjacent rectifier supply phases, other winding elements each forming part of said secondary winding means and each being connected at certain of their respective ends to the free end of said first-mentioned winding element and at their respective free ends to certain of said anodes, each of said winding elements being inductively associated with a primary phase different than that with which the others are so associated.

6. In a rectifying system, a polyphase supply line, rectifier apparatus having anodes greater in number than the number of phases of said line, and transformer means providing an operative connection between said line and said apparatus and comprising primary winding means connected to said line and providing phases of number equal to the number of phases of said line and open-star-connected secondary winding means having a neutral point and providing rectifier supply phases, a winding element forming part of said secondary winding means and being connected to said neutral point and being common with respect to adjacent rectifier supply phases, other winding elements each forming part of said secondary winding means and each being connected to said first-mentioned winding element and cooperating therewith to provide said adjacent rectifier supply phases and being connected to certain of said anodes, each of said winding elements being associated with a primary phase different than that with which the others are associated.

7. In a polyphase rectifying installation having twelve rectifier anodes, an alternating-current supply line, a transformer having a primary winding connected to said line and a secondary winding providing a neutral point and having phases connected in open star to said anodes, each of the secondary phases being composed of two winding portions belonging to different phases of said primary winding and being shifted thereagainst, the first of said winding portions being connected at one end thereof to said neutral point and being common with respect to two adjacent secondary phases, the second of said winding portions being connected to the free end of the first winding portion.

8. In a rectifying system, a polyphase supply line, rectifier apparatus having anodes, and transformer means excited from said line and providing supply phases for said anodes; said transformer means comprising an open-star-connected secondary including a winding element common with respect to certain of said supply phases, and other winding elements connected to one and the same end of said first-mentioned winding element and cooperating therewith to provide said certain supply phases.

9. In a rectifying system, a polyphase supply line, rectifier apparatus having anodes, transformer means excited from said line and including polyphase primary winding means and open-star-connected secondary winding means providing supply phases for said anodes, a winding element forming part of said secondary winding means and being common with respect to certain of said supply phases, and other winding elements forming part of said secondary winding means and being connected to one and the same end of said first-mentioned winding element and cooperating therewith to provide said certain supply phases, each of said winding elements being associated with a primary phase different than the primary phases with which the others are associated.

In testimony whereof I have signed my name to this specification.

JOHANN KÜBLER.